(12) United States Patent
Hoelzl et al.

(10) Patent No.: US 11,644,012 B2
(45) Date of Patent: May 9, 2023

(54) WIND TURBINE GEARBOX AND METHOD FOR PRODUCING A WIND TURBINE GEARBOX

(71) Applicant: Miba Gleitlager Austria GmbH, Laakirchen (AT)

(72) Inventors: Johannes Sebastian Hoelzl, Berg im Attergau (AT); Werner Schroettenhamer, Wallern (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 405 days.

(21) Appl. No.: 16/979,941

(22) PCT Filed: Mar. 20, 2019

(86) PCT No.: PCT/AT2019/060096
§ 371 (c)(1),
(2) Date: Sep. 11, 2020

(87) PCT Pub. No.: WO2019/178630
PCT Pub. Date: Sep. 26, 2019

(65) Prior Publication Data
US 2021/0010462 A1 Jan. 14, 2021

(30) Foreign Application Priority Data

Mar. 23, 2018 (AT) .............. A 50246/2018

(51) Int. Cl.
*F16C 33/06* (2006.01)
*F16C 33/14* (2006.01)
(Continued)

(52) U.S. Cl.
CPC ............ *F03D 80/70* (2016.05); *F03D 9/25* (2016.05); *F03D 15/00* (2016.05); *F16C 33/14* (2013.01);
(Continued)

(58) Field of Classification Search
CPC ...... F16C 33/08; F16C 33/121; F16C 33/122; F16C 33/125; F16C 33/14; F16C 2204/10;
(Continued)

(56) References Cited

U.S. PATENT DOCUMENTS

| 4,474,861 A | 10/1984 | Ecer |
| 5,242,717 A | 9/1993 | Tanaka et al. |

(Continued)

FOREIGN PATENT DOCUMENTS

| AT | 509 624 A1 | 10/2011 |
| AT | 510 062 B1 | 6/2012 |

(Continued)

OTHER PUBLICATIONS

DBU Abschlussberich AZ-32851, Jun. 12, 2017, total of 46 pages, including concise explanation of the relevance of same.

(Continued)

*Primary Examiner* — Phillip A Johnson
(74) *Attorney, Agent, or Firm* — Collard & Roe, P.C.

(57) ABSTRACT

A wind turbine gearbox, in particular planetary gearbox, has at least one gear which is mounted on an axle, wherein a sliding surface is arranged between the gear and the axle. The sliding surface is arranged on at least one layer of a deposition welded material made from a sliding bearing material. Furthermore, a method produces the wind turbine gearbox.

16 Claims, 6 Drawing Sheets

(51) Int. Cl.
*F03D 80/70* (2016.01)
*F03D 9/25* (2016.01)
*F03D 15/00* (2016.01)
*F16H 57/08* (2006.01)

(52) U.S. Cl.
CPC ....... *F05B 2240/50* (2013.01); *F16C 2204/12* (2013.01); *F16C 2204/14* (2013.01); *F16C 2204/20* (2013.01); *F16C 2204/34* (2013.01); *F16C 2223/46* (2013.01); *F16C 2360/31* (2013.01); *F16C 2361/61* (2013.01); *F16H 2057/085* (2013.01)

(58) Field of Classification Search
CPC .............. F16C 2204/12; F16C 2204/14; F16C 2204/20; F16C 2204/34; F16C 2240/54; F16C 33/06; F16C 2223/46; F05B 2230/233; F05B 2230/234; F05B 2240/50; B23K 9/04; B23K 9/042; B23K 9/044; B23K 9/046; B23K 9/048; B23K 2103/08; F16H 57/0471; F16H 57/082; F16H 2057/085
See application file for complete search history.

(56) References Cited

U.S. PATENT DOCUMENTS

| | | | |
|---|---|---|---|
| 5,911,513 A * | 6/1999 | Tsuji | F16C 33/127 384/912 |
| 6,163,961 A * | 12/2000 | McMeekin | F16C 33/14 29/898.056 |
| 6,326,582 B1 | 12/2001 | North | |
| 8,256,964 B2 | 9/2012 | Roeingh et al. | |
| 8,277,184 B2 | 10/2012 | Nies et al. | |
| 8,591,371 B2 | 11/2013 | Dinter et al. | |
| 8,840,521 B2 | 9/2014 | Kari et al. | |
| 9,162,423 B2 | 10/2015 | Boeschen et al. | |
| 9,416,867 B2 | 8/2016 | Van Den Donker et al. | |
| 9,419,495 B2 | 8/2016 | Kari | |
| 9,920,830 B2 * | 3/2018 | Klein-Hitpass | F16C 33/046 |
| 2002/0017507 A1 | 2/2002 | North | |
| 2006/0280597 A1 | 12/2006 | Ochiai et al. | |
| 2009/0003752 A1 † | 1/2009 | Ng | |
| 2010/0139092 A1 | 6/2010 | Sathian et al. | |
| 2010/0202885 A1 | 8/2010 | Demtröder et al. | |
| 2011/0092330 A1 * | 4/2011 | Nishida | F03D 80/70 475/159 |
| 2012/0051915 A1 | 3/2012 | Suzuki et al. | |
| 2012/0108380 A1 † | 5/2012 | Dinter | |
| 2012/0177311 A1 | 7/2012 | Isayama et al. | |
| 2013/0053210 A1 † | 2/2013 | Kari | |
| 2015/0069025 A1 | 3/2015 | Luick et al. | |
| 2015/0133260 A1 † | 3/2015 | Van Den Donker | |
| 2015/0369352 A1 | 12/2015 | Hager et al. | |
| 2017/0219088 A1 | 8/2017 | Hoelzl | |

FOREIGN PATENT DOCUMENTS

| | | | | |
|---|---|---|---|---|
| CA | 2067500 | A1 | 2/1992 | |
| CN | 1062406 | A | 7/1992 | |
| CN | 1831347 | A | 9/2006 | |
| CN | 101699086 | A | 4/2010 | |
| CN | 101849105 | A | 9/2010 | |
| CN | 102235296 | A | 11/2011 | |
| CN | 102834630 | A | 12/2012 | |
| CN | 102966669 | A | 3/2013 | |
| CN | 103038525 | A | 4/2013 | |
| CN | 103194747 | † | 7/2013 | |
| CN | 103194747 | A | 7/2013 | |
| CN | 103477122 | A | 12/2013 | |
| CN | 204805296 | † | 11/2015 | |
| CN | 204805296 | U | 11/2015 | |
| CN | 105422745 | A | 3/2016 | |
| CN | 205479172 | U | 8/2016 | |
| CN | 205715576 | U | 11/2016 | |
| CN | 206486594 | † | 9/2017 | |
| CN | 206486594 | U | 9/2017 | |
| DE | 41 42 454 | A1 | 7/1992 | |
| DE | 102 60 132 | A1 | 7/2004 | |
| DE | 10 2005 056 983 | A1 | 5/2007 | |
| DE | 10 2006 023 384 | A1 | 11/2007 | |
| DE | 20 2007 002 609 | U1 | 4/2008 | |
| DE | 102009028136 | B3 * | 1/2011 | F16C 33/107 |
| DE | 10 2011 100 456 | A1 | 11/2012 | |
| DE | 20 2011 107 611 | U1 | 11/2012 | |
| DE | 10 2012 105 089 | A1 | 12/2012 | |
| DE | 10 2012 020 584 | A1 | 4/2014 | |
| DE | 10 2016 106 112 | A1 | 10/2017 | |
| DE | 10 2017 129 361 | A1 | 6/2019 | |
| EP | 1 544 504 | A2 | 6/2005 | |
| EP | 1 602 842 | A1 | 12/2005 | |
| EP | 2 383 480 | A1 | 11/2011 | |
| EP | 2 662 598 | A1 | 11/2013 | |
| EP | 2 796 740 | A1 | 10/2014 | |
| EP | 3 290 725 | A1 | 3/2018 | |
| GB | 2251661 | † | 7/1992 | |
| GB | 2 251 661 | B | 2/1995 | |
| JP | 6121415 | † | 1/1986 | |
| JP | S61-21415 | A | 1/1986 | |
| JP | 2011-047454 | A | 3/2011 | |
| JP | 2014-152914 | A | 8/2014 | |
| WO | 00/23718 | A1 | 4/2000 | |
| WO | 2007/068503 | A2 | 6/2007 | |
| WO | 2012/012818 | A1 | 2/2012 | |
| WO | 2012/101225 | A1 | 8/2012 | |
| WO | 2012/130304 | A1 | 10/2012 | |
| WO | 2013/106878 | A1 | 7/2013 | |
| WO | 2014/128196 | A2 | 8/2014 | |
| WO | 2014128196 | † | 8/2014 | |

OTHER PUBLICATIONS

International Search Report in PCT/AT2019/060103, dated Jul. 23, 2019.
International Search Report in PCT/AT2019/060096, dated Jul. 18, 2019.
DBU Abschlussbericht (Final Report) AZ-32851 ("Laser-assisted coating technology for sustainable plain bearings as an efficient replacement for the centrifugal casting process to reduce the heavy metal content in bearing bronzes"), Jun. 12, 2017, with English translation, total of 86 pages.
YouTube video, "Korrosionsschutz: Bauteile beschichten mit Laserauftragschweissen", May 30, 2017, https://www.youtube.com/watch?v=V8H_XjDqXKA, with English translation, total of 14 pages.
Wikipedia article "Coating", last edited Dec. 18, 2017, retrieved on Oct. 10, 2022, with English translation, total of 10 pages.
E-mail from Joerg Hosemann to Ralf Dinter dated May 4, 2017, with English translation, including a photograph of a pin which was an attachment to the E-mail (D12), total of 5 pages.
"Laserauftragsschweissen" ("Laser buildup welding"), ADMOS Gleitlager GmbH (ADMOS Plain Bearings, Ltd ), May 4, 2017, with English translation, total of 57 pages.
"Laserauftragsschweissen" ("Laser buildup welding"), ADMOS Gleitlager GmbH (ADMOS Plain Bearings, Ltd ), Oct. 26, 2017, with English translation, total of 31 pages.
Report on results, 27th meeting of the Working Group Plain Bearings, VDMA Drive technology, Oct. 25, 2017, with English translation, total of 7 pages.
"Laserauftragsschweissen" ("Laser cladding"), ADMOS Gleitlager GmbH (ADMOS Plain Bearings, Ltd.), Jan. 3, 2018, with English translation, total of 63 pages.
Written statement dated Sep. 26, 2022 with copy of "Laserauftragsschweissen" ("Laser buildup welding"), ADMOS Gleitlager GmbH (ADMOS Plain Bearings, Ltd.), Oct. 26, 2017, with English translation, total of 32 pages.
M.V.S. Babu et al., "Review of Journal Bearing Materials and Current Trends", Article in American Journal of Materials Science and Technology, Jan. 2015, vol. 4, No. 2, pp. 72-83, total of 13 pages.

(56) References Cited

OTHER PUBLICATIONS

From the research: Additive manufacturing in the machining process chain (Press release Jan. 19, 2018), Production Technology Centre Hanover, Jan. 10, 2018, with English translation, total of 6 pages.
Walter Gnilke, "Technical manual—guided planets, Possibilities and limitations in comparison with roller bearings", ADMOS Gleitlager GmbH, published Feb. 15, 2005, with English translation, total of 89 pages.
Fax from Management ADMOS Plain Bearings Production and distribution company ltd. dated May 17, 2010 regarding release of blocked funds with attached letter dated May 11, 2010 enclosing a copy of the interim report on claim No. EP090092, with English translation, total of 36 pages.
"Laser Cladding", Laser Surface Engineering, Jan. 24, 2018, https://www.nutech.de/en/services/laser-centre/surface-engineering/laser-cladding, total of 2 pages.
Screen shots from YouTube video, "Laser cladding at NUTECH GmbH—Laser cladding of big cylindrical parts with wear resistant materials", Dec. 8, 2014, with annotations, total of 5 pages.
"Global full-liner for additive manufacturing", EMO 2017—DMG MORI Technology Excellence: Additive Manufacturing, Sep. 19, 2017, total of 7 pages.
Website of ADMOS Gleitlager GmbH, http://web.archive.org/web/20180317102102/http://www.admos-gleitlager.de/, Mar. 17, 2018, with English translation, total of 8 pages.
Website of ADMOS Gleitlager GmbH, http://web.archive.org/web/20170321001545/http://www.admos-gleitlager.de/, Mar. 21, 2017, with English translation, total of 4 pages.
Website of ADMOS Gleitlager GmbH, http://web.archive.org/web/20170320153708/http://www.admos-gleitlager.de/, Mar. 20, 2017, with English translation, total of 6 pages.
Thomas Schopphoven et al., "EHLA: Extreme High-Speed Laser Material Deposition—Economical and effective protection against corrosion and wear," Lasertechnik Journal, vol. 14, Issue 4, Sep. 2017, Wiley Online Library, First published on Jun. 16, 2017, pp. 26-29, total of 5 pages.
Screen shots with annotations from YouTube video, "Nutech laser cladding tool designed for cladding of difficult geometries", Dec. 18, 2017, total of 2 pages.
Screen shots with annotations from YouTube video, "Laserauftragschweissen bei der Nutech GmbH", Jun. 9, 2016, total of 4 pages.
A. Farnia et al., "Tantalum-modified Stellite 6 thick coatings: microstructure and mechanical performance", Article in Journal of Materials Science, 48, pp. 140-149, Jan. 2013, total of 11 pages.
International Standard ISO 12129-2, "Plain bearings—Part 2: Tolerances on form and position and surface roughness for shafts, flanges and thrust collars", First edition Apr. 1, 1995, total of 10 pages.
Screen shots with annotations from YouTube video, "Repairing a worn bearing journal by Laser cladding", Jun. 8, 2017, total of 5 pages.
"Plain Bearings in WTG Gearboxes", Conference for WindPower Drives 2017, pp. 1, 3, 5, 7-17, 19,21, 23-35, 37, 39-47, total of 39 pages.
F. Arias-González et al., "Laser cladding of phosphor bronze", ScienceDirect, Surface & Coatings Technology, 313 (2017), pp. 248-254, ISSN: 0257-8972, with attached receipt (D44a), total of 9 pages.
p. 86 from "Köhler/Rögnitz Maschinenteile 2" (B. Kühne, 10. edition, Vieweq+Teubner Verlaq. 2008), with English translation, ("Overhead rotation frequency" in "Plain bearing"), total of 2 pages.
p. 101 from "Köhler/Rögnitz Maschinenteile 2" (B. Kühne, 10. edition, Vieweq+Teubner Verlaq. 2008), with English translation, ("Hydrodynamically lubricated radial bearings"), total of 2 pages.
F. Arias-González et al., "Production of phosphor bronze coatings by lader cladding", ScienceDirect, Procedia Manufacturing, 13 (2017), pp. 177-182, total of 6 pages.
Website of ADMOS Gleitlager GmbH, "Energie", Mar. 21, 2017, with English translation ("Energy"), https://web.archive.org/web/20170320085949/http://www.admos-gleitlager.de/anwendungen/windkraftindustrie/, total of 4 pages.
Website of ADMOS Gleitlager GmbH, "Planetenbolzen", Mar. 21, 2017, with English translation ("Planetary bolt"), https://web.archive.org/web/20170321001545/http://www.admos-gleitlager.de/produkte/planetenbolzen/, total of 5 pages.
Website of ADMOS Gleitlager GmbH, "Getriebe", Mar. 20, 2017, with English translation ("Gearbox"), https://web.archive.org/web/20170320085941/http://www.admos-gleitlager.de/anwendungen/getriebe/, total of 5 pages.
Weisheit et al., "Direct laser cladding, current status and future scope of application", source: Majumdar, J. D.: Laser-Assisted Fabrication of Materials, Berlin: Springer, 2013 (Springer series in material science 161), ISBN: 978-3-642-28358-1 (Print), ISBN: 978-3-642-28359-8 (Online), pp. 221-240, Fraunhofer, http://publica.fraunhofer.de/documents/N-220882.html, created on Aug. 20, 2014, total of 2 pages.
Nic Sharpley, "Laser cladding to make worn main shafts like new", Jul. 31, 2013, Article on Windpower Engineering & Development Digital Edition, with comments, https://www.windpowerengineering.com/laser-cladding-to-make-worn-main-shafts-like-new/, total of 7 pages.
Paul Dvorak, "Repair strategies for wind turbine gearboxes", Aug. 8, 2013, Article on Windpower Engineering & Development Digital Edition, https://www.windpowerengineering.com/repair-strategies-for-wind-turbine-gearboxes/, total of 10 pages.
"Laser cladding eliminates component replacement", Industrial Laser Solutions, Mar. 24, 2010, https://www.laserfocusworld.com/industrial-laser-solutions/article/142 . . . , total of 4 pages.
"Laser cladding technology helps manufacturers 'go green'," Industrial Laser Solutions, Mar. 1, 2018, https://wwwlaserfocusworld.com/industrial-laser-solutions/article/142 . . . , total of 11 pages.
"Preliminary Lab Report: Laser Deposition of Bronze Materials onto Steel—Process Development—(Project Phase 1)—in cooperation with Kugler Bimetal SA", Fraunhofer IWS, Jan. 7, 2016, total of 13 pages.
Fraunhofer IWS Invoice 062-1-390-2016 for Project No. 062-167118 dated Mar. 1, 2016 to Kugler Bimetal SA, total of 1 page.
Offer 34124 from Kugler Bimetal SA to Siemens AG dated Feb. 11, 2015, with English translation, total of 4 pages.

\* cited by examiner
† cited by third party

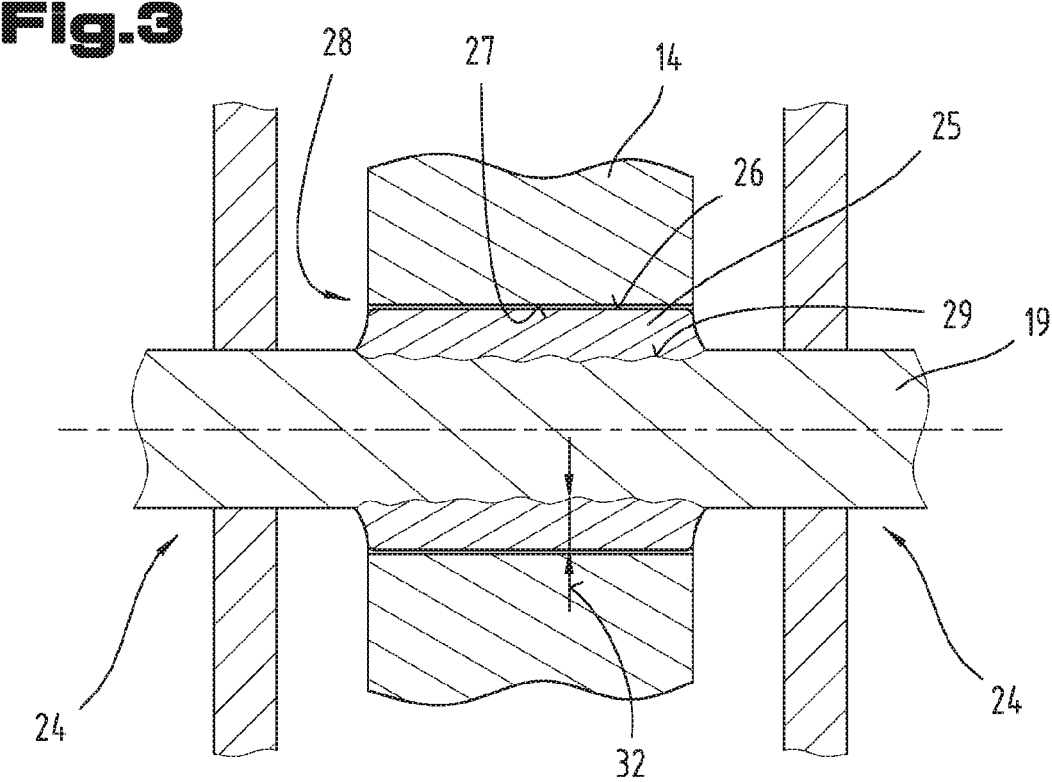
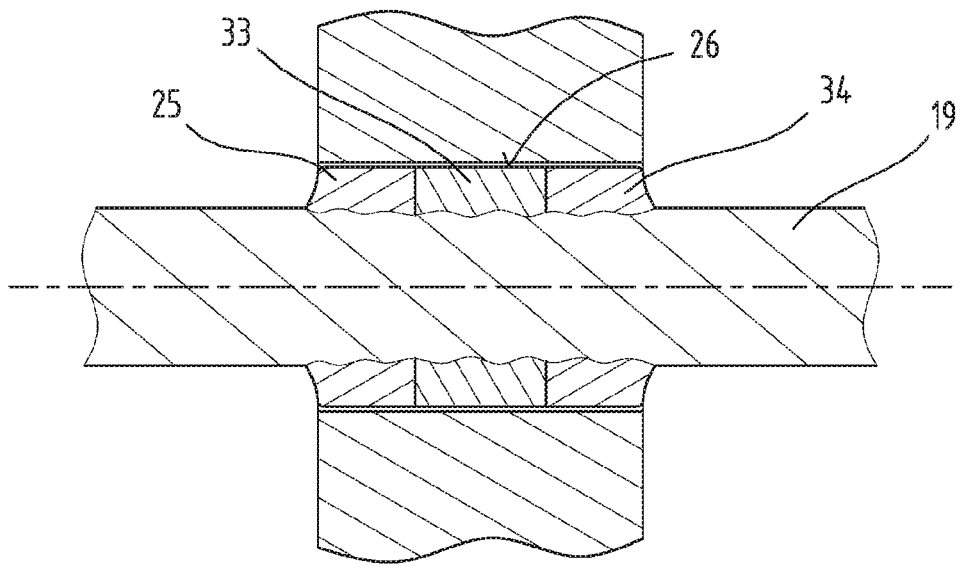

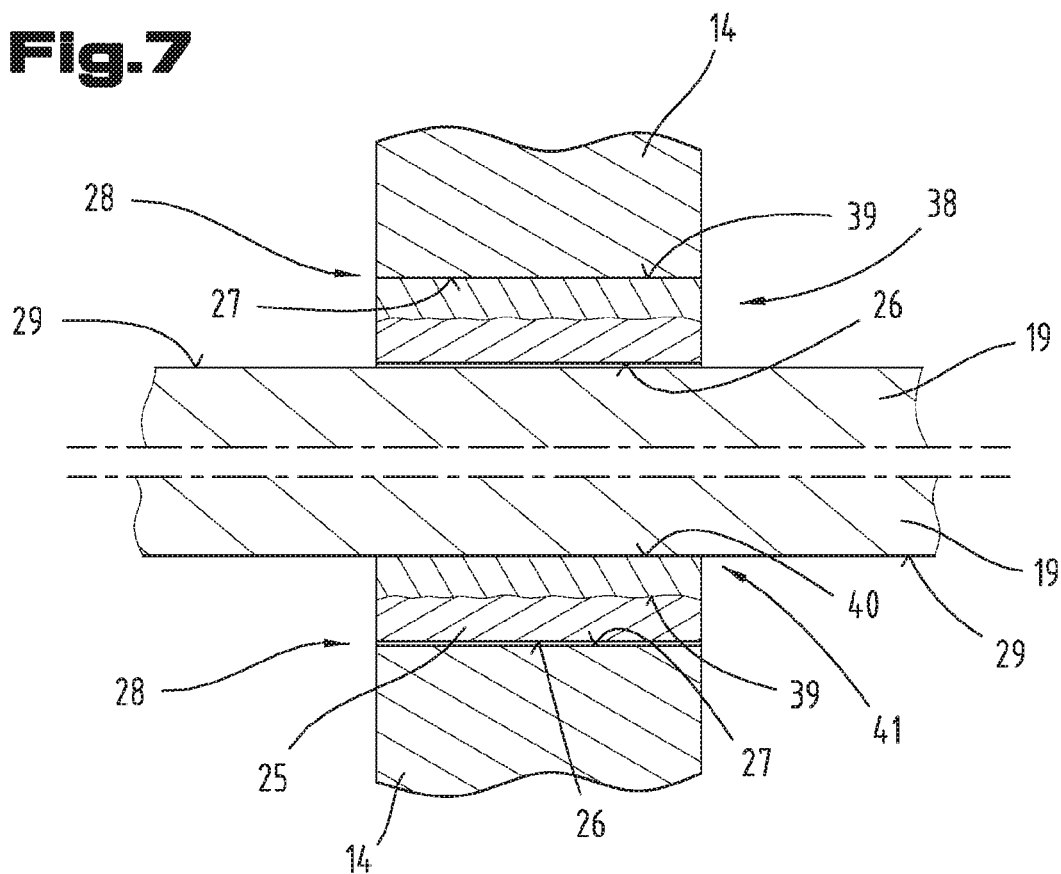
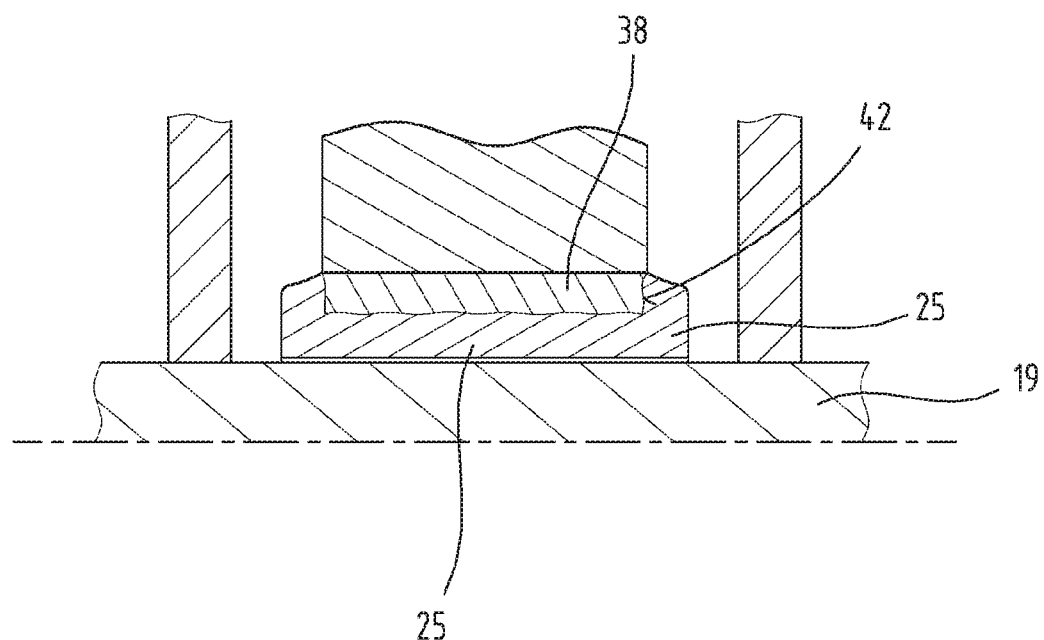

WIND TURBINE GEARBOX AND METHOD FOR PRODUCING A WIND TURBINE GEARBOX

CROSS REFERENCE TO RELATED APPLICATIONS

This application is the National Stage of PCT/AT2019/060096 filed on Mar. 20, 2019, which claims priority under 35 U.S.C. § 119 of Austrian Application No. A 50246/2018 filed on Mar. 23, 2018, the disclosure of which is incorporated by reference. The international application under PCT article 21(2) was not published in English.

BACKGROUND OF THE INVENTION

1. Field of the Invention

The invention relates to a wind turbine gearbox as well as a wind turbine equipped with the wind turbine gearbox as well as a method for producing the wind turbine gearbox.

2. Description of the Related Art

Planetary gearboxes for wind turbines for generating electric current are known, for example, from DE 102 60 132 A1. Most commonly, rolling bearings are used as bearing elements for the planetary gears in such planetary gearboxes, as is also described in DE 102 60 132 A1. However, the prior art also describes sliding bearings as bearing elements, for example in EP 1 544 504 A2 or in AT 509 624 A1. In this respect, sliding bearing bushes which are shrunk onto the axle or pressed into the planetary gear are most commonly used. The replacement of such sliding bearings in the event of maintenance or wear is complex and thus cost-intensive.

SUMMARY OF THE INVENTION

It was the object of the present invention to overcome the disadvantages of the prior art and to provide an improved wind turbine gearbox as well as an improved wind turbine. Furthermore, the object of the invention was to provide an improved method for producing a wind turbine gearbox.

This object is achieved by means of a wind turbine gearbox and a method according to the claims.

The invention relates to a wind turbine gearbox, in particular planetary gearbox, having at least one gear which is mounted on an axle, wherein a sliding surface is arranged between the gear and the axle or between the axle and an axle holder. The sliding surface is arranged on at least one layer of a deposition welded material made from a sliding bearing material.

The advantage of the wind turbine gearbox according to the invention is that based on the deposition welded sliding layer, maintenance of the sliding bearing can be facilitated in so far as hence the sliding bearing becomes accessible by a structure of the axle that can be realized relatively easily. This can even be carried out on the tower of the wind turbine, which can save time and thus costs. Moreover, the deposition welded sliding layer has the advantage over sliding bearing bushes that losses of position of the sliding bearings due to creep effects or relaxation effects can be precluded. Additionally, the wind turbine gearbox is easy and inexpensive to produce due to the deposition welded sliding layer according to the invention.

Generally, two different exemplary embodiments of the sliding bearing for rotatably mounting the gear are possible. In a first exemplary embodiment, the gear can be mounted on a sliding bearing to be rotatable relative to the axle by means of said sliding bearing. Here, the axle can be held solidly in an axle holder. Moreover, it can be provided that a sliding bearing bush is arranged between the axle and the gear. In a second exemplary embodiment, the gear can be held solidly on the axle, and the axle along with the gear can be rotatably held in the axle holder. Furthermore, it can be provided that a sliding bearing bush is arranged between the axle and the axle holder.

Moreover, it can be useful if the layer of the deposition welded material is applied directly to an outer shell surface of the axle. This entails the advantage that such a layer is easy to produce.

Moreover, it can be provided that an offset is arranged on the axle and the layer of the deposition welded material is applied directly to the end face of the offset. These measures allow to achieve an axial bearing in addition to the radial bearing.

Furthermore, it can be provided that the layer of the deposition welded material is applied directly to an inner shell surface of a bore of the gear. This can also entail advantages as in such an exemplary embodiment, the axle does not need to be processed.

In yet another embodiment variant, it can also be provided that the layer of the deposition welded material is applied directly to an inner shell surface of a bore in the axle holder.

In yet another embodiment variant, it can also be provided that a sliding bearing bush is arranged between the axle holder and the axle, wherein the layer of the deposition welded material is applied directly to the sliding bearing bush.

An embodiment according to which it can be provided that the layer of the deposition welded material is applied directly to the end face of the gear is also advantageous. This measure allows to achieve an axial bearing of the gear.

According to a further formation, it is possible that a sliding bearing bush is arranged between the gear and the axle, wherein the layer of the deposition welded material is applied directly to the sliding bearing bush. The advantage of this is that a sliding bearing bush can be easily coated with the deposition welded material.

Moreover, it can be useful if the layer of the deposition welded material is applied directly to an inner shell surface of a bore of the sliding bearing bush and the sliding bearing bush is held in a bore in the gear. A sliding bearing bush can simply be pressed into the bore of the gear.

Furthermore, it can be provided that the layer of the deposition welded material is applied directly to an outer shell surface of the sliding bearing bush and the sliding bearing bush is held on the axle. The sliding bearing bush can be easily mounted on the axle. In particular, it can be provided that the sliding bearing bush is pressed onto the axle. As an alternative to this, it can also be provided that the sliding bearing bush is mounted on the axle, for example, by means of shrinking. When establishing this type of bond, it can be provided that first, the sliding bearing bush is shrunk onto the axle and subsequently, the layer of deposition welded material is applied by means of deposition welding. In an alternative variant, it can also be provided that first, the layer of the deposition welded material is applied to the sliding bearing bush by means of deposition welding and subsequently, the sliding bearing bush is pressed and/or shrunk onto the axle.

Moreover, it can be provided that the layer of deposition welded material is applied directly to the end face of the sliding bearing bush. This measure allows to realize an axial bearing.

According to a particular embodiment, it is possible that the gear is formed as a planetary gear. Particularly in a planetary gearbox, the type of sliding bearing according to the invention entails great advantages.

According to an advantageous formation, it can be provided that the layer of the deposition welded material has a layer thickness of between 0.5 mm and 1.5 mm, in particular between 0.8 mm and 1.2 mm. Such a layer thickness entails the advantage that it can have great sliding properties, is easy to produce in terms of process and furthermore, can have a sufficient service life.

The layer thickness is measured from the surface of the workpiece before the deposition welding process on the sliding surface.

It can be particularly advantageous if the sliding surface has, on the layer of the deposition welded material, an averaged roughness depth $R_z$ of between 0.1 µm and 3.2 µm, in particular between 0.5 µm and 1.6 µm. Surfaces with such an averaged roughness depth $R_z$ entail good sliding properties and are, furthermore, easy to produce on the layer of the deposition welded material.

Furthermore, it can be provided that the deposition welded material consists of or comprises a material selected from a group comprising aluminum base alloys, tin base alloys, bronze base alloys, brass base alloys. Such materials, in particular entail good sliding properties.

Furthermore, it can be provided that the deposition welded material consists of or comprises a material which comprises at least two materials selected from a group comprising aluminum, tin, bronze, brass. Such a combination of multiple materials entails the advantage that various positive properties of the individual materials can be combined in order to also be able to have a long-term resistance in addition to good sliding properties.

An embodiment according to which it can be provided that at least two layers of the deposition welded material, offset to one another at an axial distance, are formed of different materials is also advantageous. Because of this, different materials with different material properties can be combined with one another.

According to a formation, it is possible that at least three layers of the deposition welded material, offset to one another at an axial distance, are formed of different materials, wherein the materials of the two outer layers have a lower degree of compressive strength than the material of an intermediate layer. This measure allows for the sliding bearing to have good run-in properties.

Moreover, a wind turbine having a rotor and a generator is provided, wherein a wind turbine gearbox, in particular a planetary gearbox, which is operatively connected to the rotor and the generator, is arranged between the rotor and the generator. The wind turbine gearbox is formed according to the above statements.

Moreover, a method is provided for producing a wind turbine gearbox, in particular planetary gearbox, having at least one gear which is mounted on an axle, wherein a sliding surface is arranged between the gear and the axle. The method comprises the following method steps:
  providing the gear or the axle or a sliding bearing bushing;
  deposition welding of a sliding bearing material and with
    that, depositing a layer of a deposition welded material
    directly onto the gear or the axle or a sliding bearing;
  forming the sliding surface on the layer.

The method has the advantage of being easy to carry out.

Moreover, it can be provided that when deposition welding, the layer is applied having a raw layer thickness of between 1 mm and 5 mm, in particular between 1.5 mm and 3 mm and that the layer of the deposition welded material is removed, in a subsequent processing step by means of machining, to a layer thickness of between 0.5 mm and 1.5 mm, in particular between 0.8 mm and 1.2 mm. This entails the advantage that the layer can be produced efficiently and subsequently, the sliding surface can have a sufficient surface quality.

According to a particular embodiment, it is possible that the deposition welding and the machining are carried out in one workpiece setting. This entails the advantage that the workpiece, on which the layer is deposition welded, does not have to be re-clamped into the workpiece holder between the individual processing operations. On the one hand, this reduces the non-productive times and, furthermore, the tolerance deviations, which can be caused by a re-clamping, can be kept as low as possible.

Moreover, it can be provided that a machining process for preparing a surface for the deposition welding process is carried out in the same workpiece setting.

In particular, it can be provided that, for example, the axle is clamped in a three-jaw chuck of a lathe. In a first method step, the axle can be turned on its outer circumference so that a surface is provided on which the material can be deposition welded. Subsequently, a material layer can be applied to the provided surface by means of deposition welding. This can take place in the same setting, wherein a welding robot can be guided into the region of the lathe in which the workpiece is clamped. In a subsequent method step, the deposition welded material can be partially turned in the same setting in order to provide the sliding surface.

In yet another exemplary embodiment, it can also be provided that the previously described method steps are utilized to apply a layer of a deposition welded material onto the gear.

In yet another exemplary embodiment, it can also be provided that the previously described method steps are utilized to apply a layer of a deposition welded material onto the sliding bearing bush.

Moreover, it can be provided that both a sliding surface is applied to the axle by means of a layer of a deposition welded material made from a sliding bearing material and a sliding surface is applied to the gear by means of a layer of a deposition welded material made from a sliding bearing material. The sliding surfaces of the axle and the gear can directly abut on one another in the assembled state of the wind turbine gearbox.

Moreover, it can be provided that, after the deposition welding and the forming of the sliding surface, the individual components of the wind turbine gearbox are assembled.

Moreover, it can be provided that laser deposition welding, in particular laser powder deposition welding, is used as the welding method.

It is further possible that a polymer-based running-in layer is arranged on the sliding layer so as to achieve a better adaptability of the sliding bearing running surface to the counter running surface during running in of the sliding layer, wherein it is of additional advantage that this running-in layer also improves the tribology of the sliding bearing per se. An advantage of this is that the polymer-based running-in layer can be applied by means of a spraying method.

Deposition welding according to DIN 8580—"Coating by means of welding" refers to a welding operation in which a volume buildup takes place exclusively by means of the filler metal, such as wire or powder, often in the form of a top layer. Here, the component surface to be deposition welded is melted. The method is therefore classed among the surface coating methods.

The methods of thermal spraying are also classed among the surface coating methods. According to the normative definition (DIN EN 657) filler materials, the so-called spray materials, are consumed, fused or melted in these methods within or outside of a spray torch, accelerated in a gas stream in the form of spray particles and projected onto the surface of the component to be coated. In this method, as opposed to deposition welding, the component surface is not fused and only subjected to low amounts of thermal stress. Therefore, the methods of deposition welding and thermal spraying can be clearly distinguished from one another.

BRIEF DESCRIPTION OF THE DRAWINGS

For the purpose of better understanding of the invention, it will be elucidated in more detail by means of the figures below.

These show in a respectively very simplified schematic representation:

FIG. 3 a first exemplary embodiment of a sliding bearing having a layer deposition welded onto the axle;

FIG. 4 a second exemplary embodiment of a sliding bearing having multiple layers deposition welded onto the axle;

FIG. 7 a sixth and seventh exemplary embodiment of a sliding bearing having a sleeve arranged between the gear and the axle, onto which sleeve the layer is deposition welded;

FIG. 8 an eighth exemplary embodiment of a sliding bearing having a sleeve arranged between the gear and the axle, onto which sleeve the layer is deposition welded also on the end face;

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
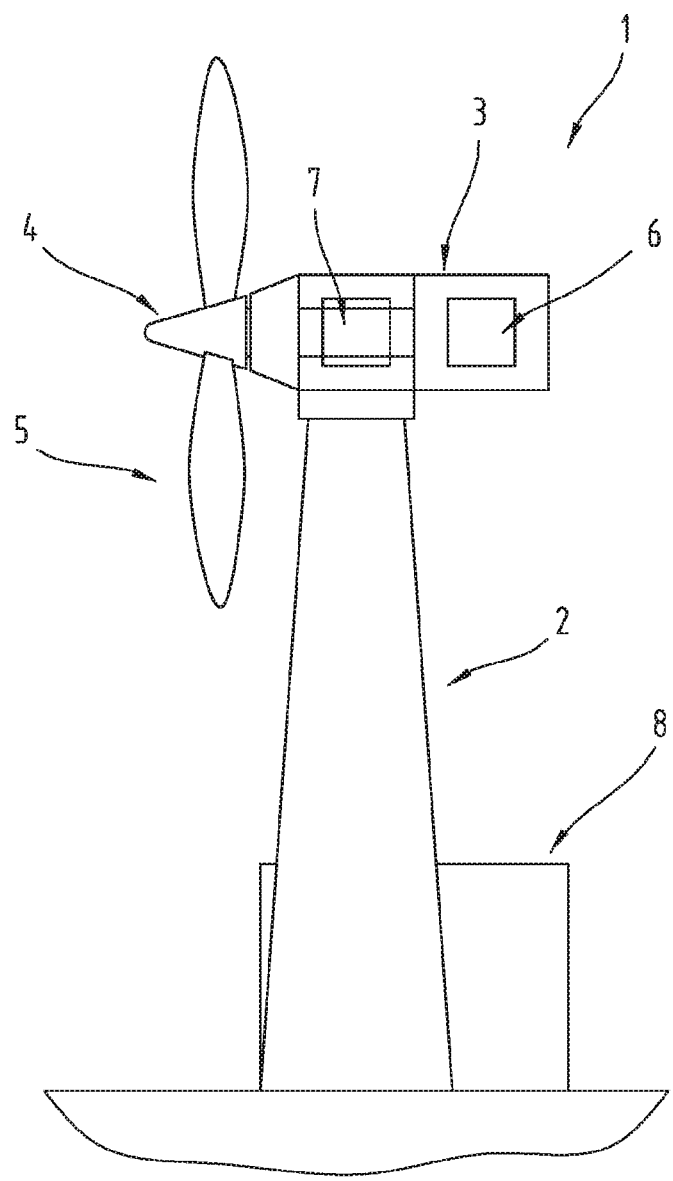
FIG. 1 a side view of a wind turbine.

FIG. 1 shows a wind turbine 1. This wind turbine 1 generally corresponds to the prior art, meaning that it comprises a tower 2 on which a nacelle 3 is arranged, on the front end of which a rotor 4 with rotor blades 5 and on the back end of which a generator 6 are arranged. A wind turbine gearbox 7, which is connected on the one hand to the rotor 4 and on the other hand to the moving member of the generator 6, is arranged between the rotor 4 and the generator 6, i.e. a not further represented moving member of the generator. The wind turbine gearbox 7 serves for increasing the rotation speed of the moving member as compared to the rotor 4. On the lower part of the tower 2, lastly, there is a network connection 8.

As these components are generally known from the prior art for wind turbines 1, reference is made here to the relevant literature on this subject. However, it should be mentioned that the wind turbine 1 is not obligatorily limited to the type represented in FIG. 1.

Figure 2:
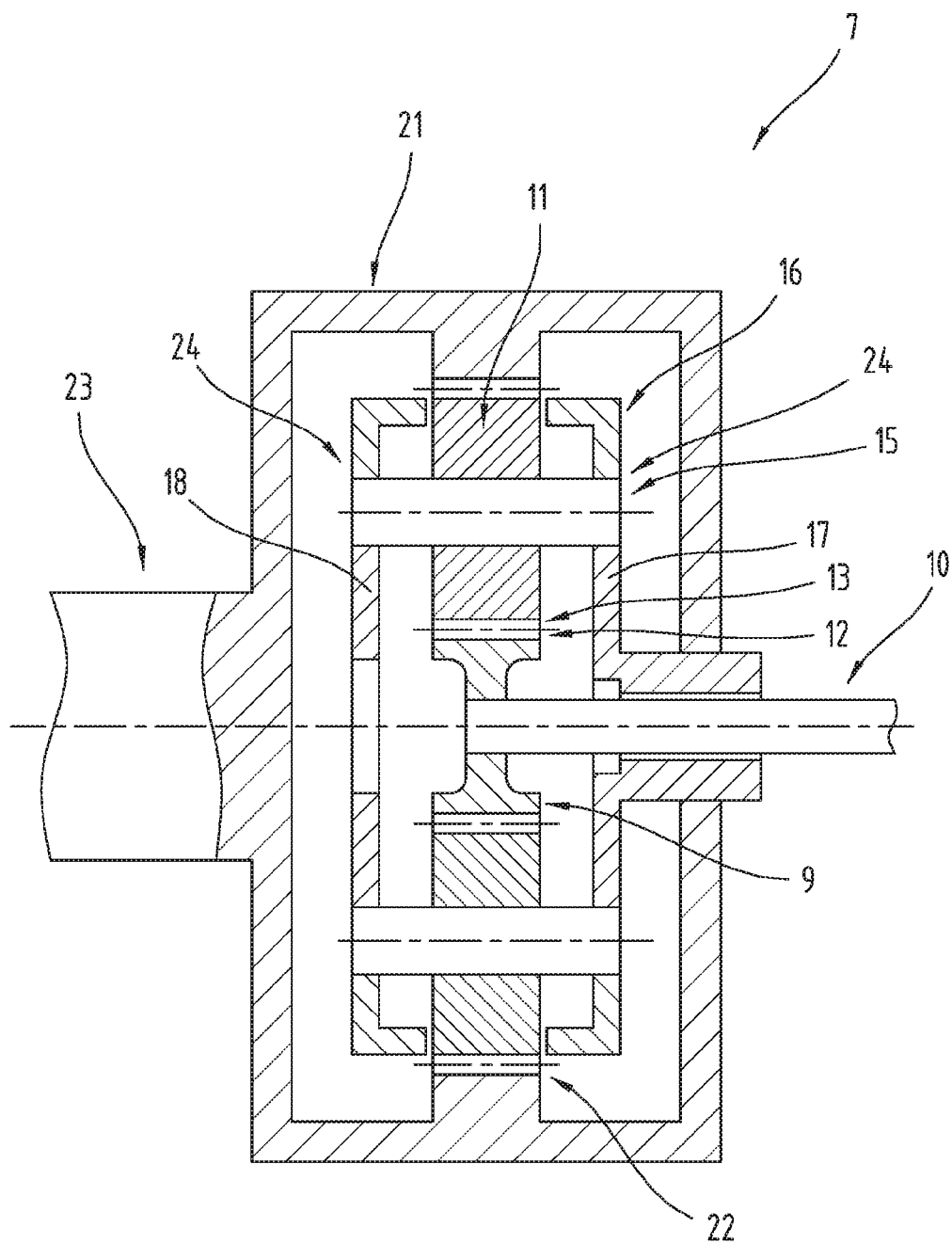
FIG. 2 a sectional side view of a wind turbine gearbox in the form of a planetary gearbox.

FIG. 2 shows the wind turbine gearbox 7 in the form of a simple planetary gearbox in a side view.

The planetary gearbox 7 has a sun gear 9 connected in a motion-coupled manner to a shaft 10 leading to the generator rotor. The sun gear 9 is surrounded by multiple planetary gears 11, for example two, preferably three or four. Both the sun gear 9 and the planetary gears 11 have outer end toothings 12, 13 which are engaged in a meshing arrangement, wherein these end toothings 12, 13 are schematically represented in FIG. 2.

The planetary gears 11 are also referred to generically as gears 14 throughout this document. The group of the gears 14 may also comprise further gears in addition to the planetary gears 11.

The planetary gears 11 are held in the planetary carrier 16 by means of a planetary gear axle 15, wherein a first receiving section 17 and a second receiving section 18 are provided in the planetary carrier 16, in which receiving sections 17, 18 the planetary gear axle 15 is held, in particular clamped. The two receiving sections 17, 18 are also referred to generically as axle holder 24.

In an alternative exemplary embodiment, it can also be provided that the planetary gears 11 are solidly coupled with a planetary gear axle 15 and the planetary gear axle 15 is rotatably held in the axle holder 24.

The planetary gear axles 15 are also referred to generically as axle 19 throughout this document. The group of the axles 19 may also comprise further axles in addition to the planetary gear axles 15.

An internal gear 21 is arranged to surround the planetary gears 11, which internal gear 21 has an internal toothing 22 which is engaged in a meshing arrangement with the end toothing 13 of the planetary gears 11. The internal gear 21 is motion-coupled with a rotor shaft 23 of the rotor of the wind turbine. The end toothings 12, 13 and/or the internal toothing 22 can be formed as spur toothing, as helical toothing or as double helical toothing.

As such planetary gearboxes 7 are in principle also already known from the prior art, for example from the previously cited document regarding the prior art, further explanations are superfluous here.

It should be noted that, in the following, the planetary gear 11 is referred to in the singular form. However, it is self-evident that, in the preferred embodiment, all planetary gears 11 are formed according to the invention.

FIGS. 3 to 9 show different and independent embodiments of the sliding bearing, wherein again, equal reference numbers and/or component designations are used for equal parts as in the respectively preceding figures. In order to avoid unnecessary repetitions, it is pointed to/reference is made to the detailed description in the respectively preceding figures.

FIG. 3 shows a schematic representation of a first exemplary embodiment of a sliding bearing for mounting the gear 14.

As can be seen in FIG. 3, it can be provided that a layer 25 of a deposition welded material made of a sliding bearing material is arranged on the axle 19. A sliding surface 26 is formed on the layer 25, with which sliding surface 26 an inner shell surface 27 of a bore 28 of the gear 14 can directly cooperate. Therefore, in the exemplary embodiment according to FIG. 3, the gear 14 is rotatably mounted relative to the axle 19 on the same.

In particular, it can be provided that the layer 25 of the deposition welded material was applied directly to an outer shell surface 29 of the axle 19 by means of deposition welding.

In the exemplary embodiment according to FIG. 3, the axle 19 is held solidly in the axle holder 24 and therefore not rotatable relative to the axle holder 24. In particular, it can be provided that the axle 19 directly abuts on an inner shell surface 30 of a bore 31 of the axle holder 24. The layer 25 of the deposition welded material can have a layer thickness 32 of between 0.2 mm and 5 mm.

In FIG. 4, a further and possibly independent embodiment of the sliding bearing is shown, wherein again equal reference numbers and/or component designations are used for equal parts as in the preceding FIGS. 2 and 3. In order to avoid unnecessary repetitions, it is pointed to/reference is made to the detailed description in FIGS. 2 and 3 preceding it.

In the exemplary embodiment according to FIG. 4, a first layer 25, a second layer 33 and a third layer 34 are deposition welded onto the axle 19, wherein the individual layers 25, 33, 34 have different material properties. In particular, it can be provided that the two outer layers 25, 34 have a lower degree of compressive strength and/or a lower degree of surface hardness than the material of the layer 33 position between them. The individual layers 25, 33, 34 can have a uniform layer thickness 32, so that a continuous sliding surface 26 is formed. As an alternative, it can be provided that the layer thicknesses 32 of the individual layers 25, 33, 34 are slightly different, so that, for example, the two outer layers 25, 34 have a slightly greater layer thickness 32, whereby the run-in properties of the sliding bearing can be improved.

Figure 5:
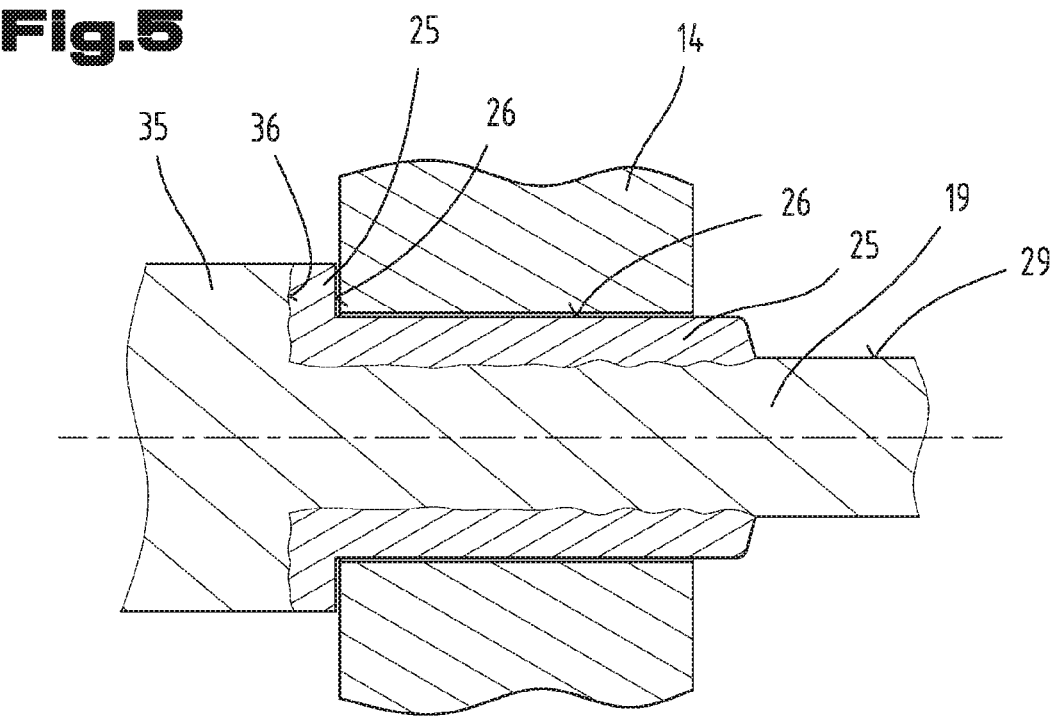
FIG. 5 a third exemplary embodiment of a sliding bearing having a layer deposition welded onto the axle, which layer is also arranged on the end face.

FIG. 5 shows a further and possibly independent embodiment of the sliding bearing for mounting the gear 14, wherein again, equal reference numbers and/or component designations are used for equal parts as in the preceding FIGS. 2 to 4. In order to avoid unnecessary repetitions, it is pointed to/reference is made to the detailed description in FIGS. 2 through 4 preceding it.

As it can be seen in FIG. 5, it can be provided that the axle 19 has an offset 35 which forms an end face 36. The layer 25 of the deposition welded material can be arranged both on the outer shell surface 29 and the end face 36 of the axle 19. These measures allow to also achieve an axial bearing of the gear 14 in addition to the radial bearing.

Figure 6:
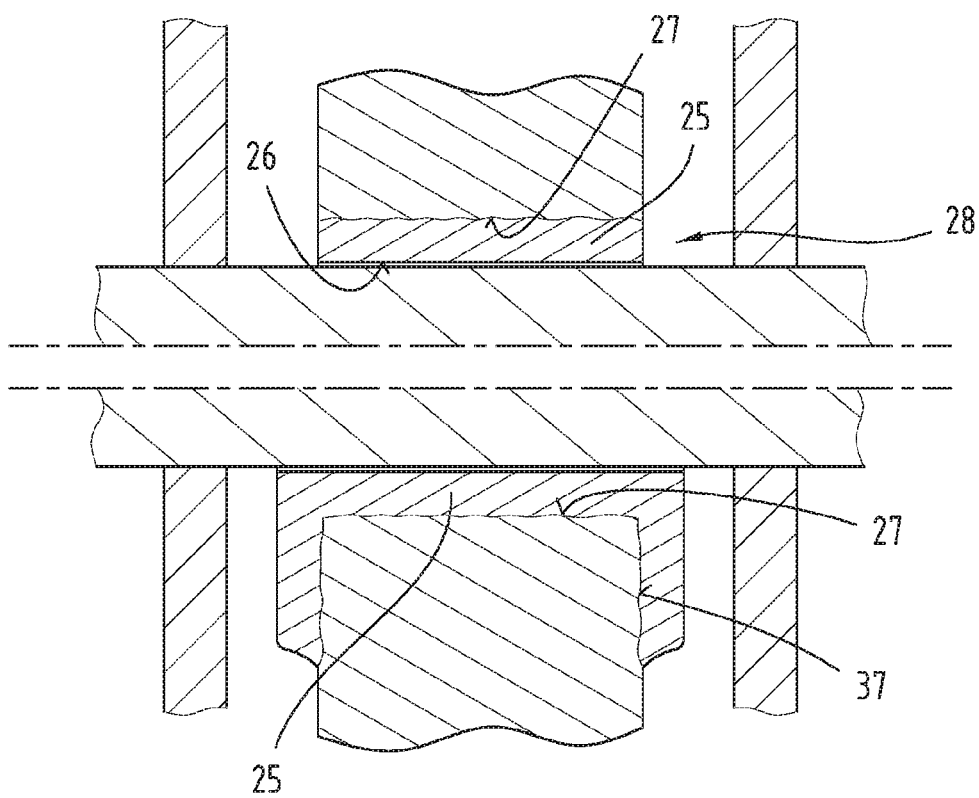
FIG. 6 a fourth and a fifth exemplary embodiment of a sliding bearing having a layer deposition welded onto the gear.

In FIG. 6, two further and possibly independent embodiments of the sliding bearing are shown, wherein again equal reference numbers and/or component designations are used for equal parts as in the preceding FIGS. 2 and 5. In order to avoid unnecessary repetitions, it is pointed to/reference is made to the detailed description in FIGS. 2 through 5 preceding it.

In the upper half of the section in FIG. 6, the first layer 25 of the deposition welded material is applied directly to the inner shell surface 27 of the bore 28 of the gear 14. The sliding surface 26 is therefore arranged on the gear 14. In such an exemplary embodiment, the axle 19 does not need to have a surface coating.

In the bottom half of the section in FIG. 6, a similar exemplary embodiment as the one of the upper half of the section is shown, wherein in this exemplary embodiment, the layer 25 of the deposition welded material is also applied to the end face 37 of the gear 14 in addition to being applied on the inner shell surface 27 of the bore 28 of the gear 14. In such an exemplary embodiment, an axial bearing of the gear 14 can be achieved in addition to the radial bearing of the gear 14.

In FIG. 7, two further and possibly independent embodiments of the sliding bearing are shown, wherein again equal reference numbers and/or component designations are used for equal parts as in the preceding FIGS. 2 and 6. In order to avoid unnecessary repetitions, it is pointed to/reference is made to the detailed description in FIGS. 2 through 6 preceding it.

In FIG. 7, also in the upper half of the section, a first exemplary embodiment is represented and in the bottom half of the section, a second exemplary embodiment is represented.

In the exemplary embodiment of the upper half of the section in FIG. 7, a sliding bearing bush 38 is arranged between the gear 14 and the axle. 19. Here, an outer shell surface 39 of the sliding bearing bush 38 can directly abut on the inner shell surface 27 of the bore 28 of the gear 14. In particular, it can be provided that the sliding bearing bush 38 is pressed into the gear 14. Here, the layer 25 of the deposition welded material can be arranged on an inner shell surface 40 of a bore 41 of the sliding bearing bush 38. Thus, the sliding surface 26 which, in this case, is formed on the sliding bearing bush 38 can directly abut on the outer shell surface 29 of the axle 19. The sliding bearing bush 38 in this exemplary embodiment is solidly coupled with the gear 14 and rotates along with it.

In the second exemplary embodiment of FIG. 7, which is shown in the bottom half of the section, the inner shell surface 40 of the bore 41 of the sliding bearing bush 38 abuts directly on the outer shell surface 29 of the axle 19 and therefore the sliding bearing bush 38 is held solidly on the axle 19. Here, the layer 25 of the deposition welded material is arranged on the outer shell surface 39 of the sliding bearing bush 38. The sliding surface 26 directly interacts with the inner shell surface 27 of the bore 28 of the gear 14, wherein the gear 14 is rotatable relative to the sliding bearing bush 38 and therefore also relative to the axle 19.

FIG. 8 shows a further and possibly independent embodiment of the sliding bearing for mounting the gear 14, wherein again, equal reference numbers and/or component designations are used for equal parts as in the preceding FIGS. 2 to 7. In order to avoid unnecessary repetitions, it is pointed to/reference is made to the detailed description in FIGS. 2 through 7 preceding it.

FIG. 8 shows a similar exemplary embodiment of the sliding bearing as it is represented in the upper half of the section in FIG. 7. In the exemplary embodiment of FIG. 8, a layer 25 of the deposition welded material is arranged on the end face 42 in addition to the sliding bearing bush 38. A sliding bearing bush 38 formed in this way can therefore also have axial bearing properties in addition to the radial bearing properties.

In the exemplary embodiments according to FIG. 7 and FIG. 8, multiple layers 25, 33, 34 of the deposition welded material can of course also be formed analogously to FIG. 4.

Figure 9:
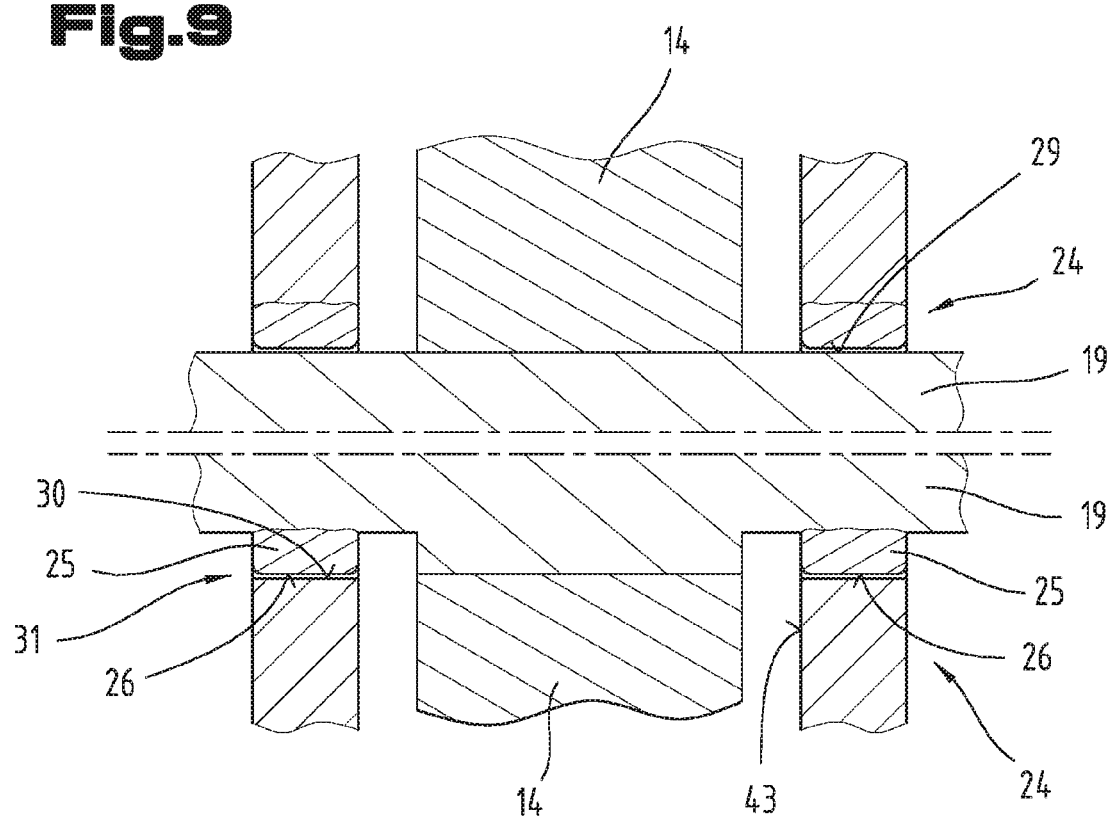
FIG. 9 a ninth and a tenth exemplary embodiment of a sliding bearing having a layer which is deposition welded onto the axle holder and/or the axle.

In FIG. 9, two further and possibly independent embodiments of the sliding bearing are shown, wherein again equal reference numbers and/or component designations are used for equal parts as in the preceding FIGS. 2 and 8. In order to avoid unnecessary repetitions, it is pointed to/reference is made to the detailed description in FIGS. 2 through 8 preceding it.

In the upper half of the section in FIG. 9, the gear 14 is held directly on the axle 19 and therefore rotates along with it. Here, the axle 19 is held so as to be rotatable in the axle holder 24. Here, it can be provided that the layer 25 of the deposition welded material is arranged on the inner shell surface 30 of the axle holder 24. Therefore, the sliding surface 26 of the layer 25 cooperates directly with the outer shell surface 29 of the axle 19.

In the second exemplary embodiment according to FIG. 9, which is represented in the bottom half of the section, the gear 14 is also solidly connected with the axle 19. Here, the sliding bearing between the axle 19 and the axle holder 24 is realized such that the layer 25 of the deposition welded material is applied to the outer shell surface 29 of the axle 19 and thus forms the sliding surface 26. This sliding surface 26 cooperates directly with the inner shell surface 30 of the bore 31 of the axle holder 24.

Building on the exemplary embodiments of FIG. 9, it can naturally also be provided that there is a layer 25 of a deposition welded material also arranged on an inner surface 43 of the axle holder 24. Such an exemplary embodiment, however, is not represented.

Moreover, building on the exemplary embodiment according to FIG. 9 and analogously to the previously described exemplary embodiments, a sliding bearing bush 38 can be provided which, in this case, is arranged between the axle holder 24 and the axle 19. Here, the sliding bearing bush 38 can be coupled solidly with the axle 19 and therefore rotate along with it or it can be held in the axle holder 24, wherein the axle 19 rotates relative to the sliding bearing bush 38.

Figure 10:
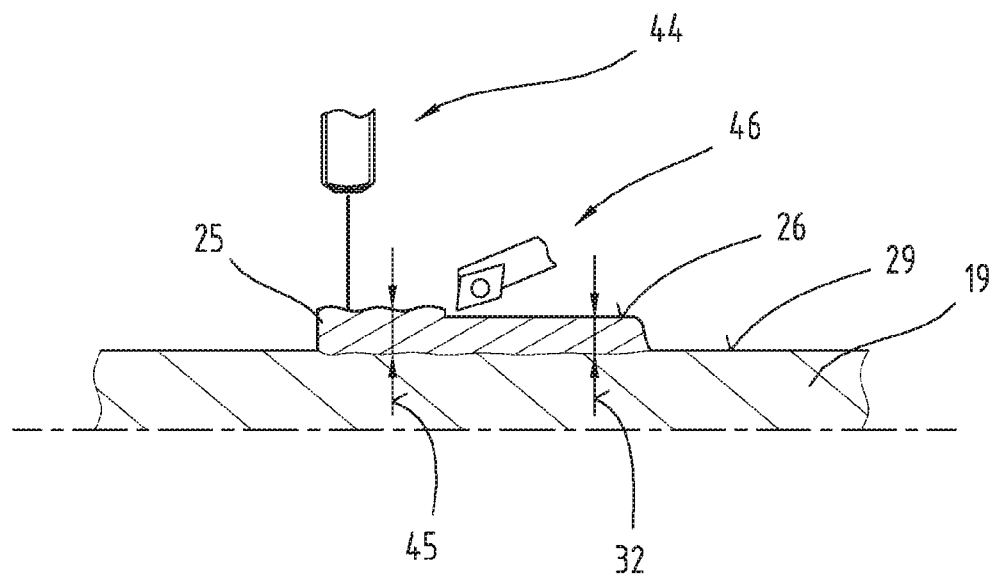
FIG. 10 a schematic representation of the method steps for producing a deposition welded sliding bearing layer.

FIG. 10 shows possible method steps for producing the layer 25 of the deposition welded material. In the exemplary embodiment according to FIG. 10, the layer 25 is deposition welded onto the outer shell surface 29 of the axle 19. Of course, the same method procedures are also applied in the other described exemplary embodiments.

As it can be seen in FIG. 10, it can be provided that, in a first method step, the layer 25 is deposition welded onto the outer shell surface 29 of the axle 19 by means of a welding head 44. Here, the layer 25 can have a raw layer thickness 45. In a subsequent method step, the layer 25 can be processed by means of a machining tool 46, so that the sliding surface 26 can be produced. Thereby, the final layer thickness 32 is produced. The processing tool 46 can be formed, for example, in the form of a turning tool, in the form of a milling tool, or also as a grinding disk. In particular, it can also be provided that the layer 25 is processed in different processing steps, so that, for example, the surface is first removed by means of a turning tool and subsequently ground.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

| List of reference numbers | |
|---|---|
| 1 | wind turbine |
| 2 | tower |
| 3 | nacelle |
| 4 | rotor |
| 5 | rotor blade |
| 6 | generator |
| 7 | wind turbine gearbox |
| 8 | network connection |
| 9 | sun gear |
| 10 | shaft |
| 11 | planetary gear |
| 12 | end toothing sun gear |
| 13 | end toothing planetary gear |
| 14 | gear |
| 15 | planetary gear axle |
| 16 | planetary carrier |
| 17 | first receiving section |
| 18 | second receiving section |
| 19 | axle |
| 20 | bearing seat |
| 21 | internal gear |
| 22 | internal toothing |
| 23 | rotor shaft |
| 24 | axle holder |
| 25 | first layer |
| 26 | sliding surface |
| 27 | inner shell surface bore gear |
| 28 | bore gear |
| 29 | outer shell surface axle |
| 30 | inner shell surface bore axle holder |
| 31 | bore axle holder |
| 32 | layer thickness |
| 33 | second layer |
| 34 | third layer |
| 35 | offset axle |
| 36 | end face offset |
| 37 | end face gear |
| 38 | sliding bearing bush |
| 39 | outer shell surface sliding bearing bush |
| 40 | inner shell surface bore sliding bearing bush |
| 41 | bore sliding bearing bush |
| 42 | end face sliding bearing bush |
| 43 | inner surface axle holder |
| 44 | welding head |
| 45 | raw layer thickness |
| 46 | processing tool |

The invention claimed is:

1. A wind turbine gearbox having at least one gear which is mounted on an axle,
wherein a sliding surface is arranged between the gear and the axle or between the axle and an axle holder,
wherein the sliding surface is arranged on at least one layer of a deposition welded material made of a sliding bearing material,
wherein the layer of the deposition welded material is applied directly to an outer shell surface of the axle, and
wherein an offset is arranged on the axle and the layer of the deposition welded material is applied directly to the end face of the offset.

2. The wind turbine gearbox according to claim 1, wherein the gear is designed as a planetary gear.

3. The wind turbine gearbox according to claim 1, wherein the deposition welded material consists of or comprises a material selected from a group comprising aluminum base alloys, tin base alloys, bronze base alloys, brass base alloys.

4. The wind turbine gearbox according to claim 1, wherein the deposition welded material consists of or comprises a material which comprises at least two materials selected from a group comprising aluminum, tin, bronze, brass.

5. A wind turbine having a rotor and a generator, wherein a wind turbine gearbox, which is operatively connected to the rotor and the generator is arranged between the rotor and the generator, wherein the wind turbine gearbox is designed according to claim 1.

6. A wind turbine gearbox 4 having at least one gear which is mounted on an axle,
wherein a sliding surface is arranged between the gear and the axle or between the axle and an axle holder,
wherein the sliding surface is arranged on at least one layer of a deposition welded material made of a sliding bearing material,
wherein the layer of the deposition welded material is applied directly to an inner shell surface of a bore of the gear, and
wherein the layer of the deposition welded material is applied directly to the end face of the gear.

7. A wind turbine gearbox having at least one gear which is mounted on an axle,
wherein a sliding surface is arranged between the gear and the axle or between the axle and an axle holder,
wherein the sliding surface is arranged on at least one layer of a deposition welded material made of a sliding bearing material,
wherein a sliding bearing bush is arranged between the gear and the axle, wherein the layer of the deposition welded material is applied directly to the sliding bearing bush.

8. The wind turbine gearbox according to claim 7, wherein the layer of the deposition welded material is applied directly to an inner shell surface of the sliding bearing bush and the sliding bearing bush is held in a bore of the gear.

9. The wind turbine gearbox according to claim 7, wherein the layer of the deposition welded material is applied directly to an outer shell surface of the sliding bearing bush and the sliding bearing bush is held on the axle.

10. The wind turbine gearbox according to claim 7, wherein the layer of the deposition welded material is applied directly to the end face of the sliding bearing bush.

11. A wind turbine gear box having at least one gear which is mounted on an axle,
wherein a sliding surface is arranged between the gear and the axle or between the axle and an axle holder,
wherein the sliding surface is arranged on at least one layer of a deposition welded material made of a sliding bearing material, and
wherein the layer of the deposition welded material has a layer thickness of between 0.5 mm and 1.5 mm.

12. A wind turbine gear box having at least one gear which is mounted on an axle,
wherein a sliding surface is arranged between the gear and the axle or between the axle and an axle holder,
wherein the sliding surface is arranged on at least one layer of a deposition welded material made of a sliding bearing material, and
wherein the sliding surface has, on the layer of the deposition welded material, an averaged roughness depth $R_z$ of between 0.1 μm and 3.2 μm.

13. A wind turbine gearbox having at least one gear which is mounted on an axle,
wherein a sliding surface is arranged between the gear and the axle or between the axle and an axle holder,
wherein the sliding surface is arranged on at least one layer of a deposition welded material made of a sliding bearing material, and
wherein at least two layers of the deposition welded material, offset to one another at an axial distance, are formed of different materials.

14. The wind turbine gear box according to claim 13,
wherein at least three layers of the deposition welded material, offset to one another at an axial distance, are formed of different materials, and
wherein the materials of the two outer layers of the at least three layers have a lower degree of compressive strength than the material of an intermediate layer.

15. A method for producing a wind turbine gearbox having at least one gear which is mounted on an axle, wherein a sliding surface is arranged between the gear and the axle, wherein the method comprises the following steps:
providing the gear or the axle or a sliding bearing bushing;
deposition welding of a sliding bearing material and with that, depositing a layer of a deposition welded material directly onto the gear or the axle or a sliding bearing; forming the sliding surface on the layer;
wherein when deposition welding, the layer is applied having a raw layer thickness of between 1 mm and 5 mm, and
wherein the layer of the deposition welded material is removed, in a subsequent processing step by machining, to a layer thickness of between 0.5 mm and 1.5 mm.

16. The method according to claim 15, wherein the deposition welding and the machining are carried out in one workpiece setting.

* * * * *

UNITED STATES PATENT AND TRADEMARK OFFICE
CERTIFICATE OF CORRECTION

PATENT NO.        : 11,644,012 B2
APPLICATION NO.   : 16/979941
DATED             : May 9, 2023
INVENTOR(S)       : Johannes Hoelzl et al.

It is certified that error appears in the above-identified patent and that said Letters Patent is hereby corrected as shown below:

In the Claims

In Claim 6, Line 1 (Column 11, Line 31), please delete "4"

Signed and Sealed this
Thirteenth Day of June, 2023

Katherine Kelly Vidal
*Director of the United States Patent and Trademark Office*